(12) United States Patent
Moffat et al.

(10) Patent No.: US 7,307,111 B2
(45) Date of Patent: Dec. 11, 2007

(54) POLYMER PARTICLES CONTAINING A CROSS-LINKED POLYMER CORE AND A LINEAR NON-CROSS-LINKED POLYMER SHELL, AND TONER FORMED THEREFROM

(75) Inventors: Karen A. Moffat, Brantford (CA); Daryl Vanbesien, Burlington (CA); Ke Zhou, Mississauga (CA); Paul J. Gerroir, Oakville (CA); Valerie M. Farrugia, Oakville (CA); Maria N. V. McDougall, Burlington (CA); Edward G. Zwartz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 419 days.

(21) Appl. No.: 11/012,495

(22) Filed: Dec. 16, 2004

(65) Prior Publication Data

US 2006/0135650 A1 Jun. 22, 2006

(51) Int. Cl.
*C08L 83/00* (2006.01)
(52) U.S. Cl. ...................................................... 523/201
(58) Field of Classification Search ................. 523/201
See application file for complete search history.

(56) References Cited

U.S. PATENT DOCUMENTS

| | | | | |
|---|---|---|---|---|
| 3,830,878 | A | * | 8/1974 | Kato et al. .................... 525/72 |
| 4,433,102 | A | * | 2/1984 | Brandstetter et al. .......... 525/75 |
| 6,242,519 | B1 | * | 6/2001 | Cheret et al. ................ 524/396 |
| 6,767,684 | B1 | | 7/2004 | Patel et al. |

* cited by examiner

*Primary Examiner*—Bernard Lipman
(74) *Attorney, Agent, or Firm*—Oliff & Berridge, PLC

(57) ABSTRACT

Polymer particles comprising a cross-linked polymer core and a linear non-cross-linked polymer shell may be formed by emulsion polymerization. The polymer particles may be used in forming toner.

14 Claims, 9 Drawing Sheets

POLYMER PARTICLES CONTAINING A CROSS-LINKED POLYMER CORE AND A LINEAR NON-CROSS-LINKED POLYMER SHELL, AND TONER FORMED THEREFROM

BACKGROUND

The invention relates to polymer particles comprising a cross-linked polymer core and a linear non-cross-linked polymer shell. These polymer particles, which can be formed by emulsion polymerization, can be aggregated with colorant to form toner.

U.S. Pat. No. 6,767,684 to Patel et al., which is herein incorporated by reference in its entirety, describes an emulsion aggregation process for forming toner that combines both a latex containing a cross-linked resin and a latex containing a resin free of cross-linking. The process comprises, inter alia, mixing a colorant dispersion comprising an acicular magnetite dispersion and a colorant with the latexes, a wax dispersion, and a coagulant; heating the resulting mixture below about the glass transition temperature (Tg) of the latex resin to form toner sized aggregates; adding to the formed toner aggregates a further resin latex; adding a base to adjust the pH; and heating the resulting aggregate suspension to permit fusion or coalescence of the toner aggregates.

SUMMARY

For matte toner applications, the gloss of the fused image is generally required to be <12 gloss units at the defined fusing temperature. A dual latex approach having both a cross-linked resin latex and a linear resin latex may be used to prepare toner that can be used in matte toner applications. For example, the main linear latex may be a styrene/acrylate latex having a particle size ranging from about 200 to about 250 nm. In contrast, the cross-linked latex, which may be a gel latex, may be much smaller at about 50 nm.

However, developing two separate latexes may not always be the most cost efficient approach. Thus, there is a need to combine the properties of a cross-linked latex with a linear polymer resin in a single latex design. There is also a need to develop an emulsion polymerization process where there is control over how the polymer cross-linking or the cross-linked density is distributed throughout the subsequent toner made with the single latex.

An embodiment of the present invention is directed to a single emulsion polymerized latex approach that produces a cross-linked core surrounded by a linear non-cross-linked shell. In embodiments of this invention, the size range of the latex particles ranges from about 180 to about 250 nm, preferably from about 200 to about 250 nm. The core/shell latex may be made by controlled starve-fed semi-continuous emulsion polymerization where the core monomer solution is of a different composition than the shell monomer solution. In embodiments of the invention, the core monomer solution contains the cross-linking component. The weight ratio of latex core to shell can range from for example 10 percent core to 90 percent shell as well as, 20/80, 30/70, 40/60 and 50/50 core to shell ratios.

In embodiments of the invention, the polymer particles of the latex comprise from about 1% to about 70%, preferably from about 5% to about 50%, more preferably from about 10% to about 40%, by weight of the cross-linked polymer core and from about 99% to about 30%, preferably from about 95% to about 50%, more preferably from about 90% to about 10%, by weight of the linear non-cross-linked polymer shell. The ratio of cross-linked polymer to non-cross linked polymer in the latex is dependent on the desired properties of the toner. Thus, the values above should not be construed as being limiting.

To form the cross-linked polymer core, any cross-linker may be used. As used herein, the term "cross-linker" refers to a difunctional material that can be used to cross-link a polymer. Cross-linkers that may be used, include, but are not limited to, divinyl benzene, divinyl toluene, diacrylates and dimethacrylates. Divinyl benzene is a preferred cross-linker.

In embodiments, the polymer particles comprise from about 0.1% to about 40% by weight of at least one cross-linker. Preferably, the polymer particles comprise from about 0.2% to about 30% by weight of at least one cross-linker. These amount are based on the amount of monomer in the entire polymer particle, not just in the cross-linked polymer core.

In embodiments of the invention, the polymer particles comprise a styrene acrylic copolymer. As used herein, the term "styrene acrylic copolymer" refers to a copolymer containing styrene monomers and acrylic monomers. In embodiments of the invention, a styrene acrylic copolymer forms both the cross-linked polymer core and the linear non-cross-linked polymer shell, the styrene acrylic copolymer in the cross-linked polymer core being a cross-linked styrene acrylic copolymer.

As used herein, the term "styrene monomer" refers to styrene per se, as well as styrene containing one or more substitutions, such as 3-chlorostyrene, 2,5-dichlorostyrene, 4-bromostyrene, 4-tert-butylstyrene, 4-methoxystyrene and the like.

As used herein, the term "acrylic monomer" refers to acrylic acid, methacrylic acid, and esters of acrylic acid and methacrylic acid. Acrylic monomers include, but are not limited to, butyl acrylate, butyl methacrylate, propyl acrylate, propyl methacrylate, ethyl acrylate, ethyl methacrylate, methyl acrylate and methyl methacrylate. In preferred embodiments, the acrylic monomer is n-butyl acrylate.

Although the majority of the monomers forming the styrene acrylic, copolymer are styrene monomers or acrylic monomers, the styrene acrylic copolymer may contain other monomers. Suitable monomers include, but are not limited to, vinyl esters of aliphatic acids and ethylenically unsaturated carboxylic acids. In embodiments of the invention, styrene monomers and acrylic monomers form at least 90% by weight of the copolymer.

In embodiments of the invention, styrene monomer is used in the copolymer in amounts greater than about 15 weight percent. Preferably, the amount of styrene monomer is from about 15 to about 85 weight percent, more preferably from about 60 to about 85 weight percent, based on the total weight of the polymer particles.

In embodiments of the invention, acrylic monomer is used in the copolymer in amounts of greater than about 15 weight percent. Preferably, the amount of acrylic monomer is from about 15 to about 85 weight percent, more preferably from about 15 to about 40 weight percent, based on the total weight of the polymer particles.

In a particularly preferred embodiment, the monomers forming the copolymer comprise styrene, n-butyl acrylate and 2-carboxyethyl acrylate (β-CEA). In preferred embodiments of the invention, the copolymer contains from about 60 to about 80 weight percent styrene, about 15 to about 35 weight percent n-butyl acrylate and about 1 to about 5 weight percent β-CEA.

The polymer particles of the present invention may be formed by emulsion polymerization. In particular, the polymer particles may be formed by starve feed emulsion polymerization. Emulsion polymerization methods are known in the art. In particular, emulsion polymerization methods are described in, for example, U.S. Pat. No. 6,180,307, which is incorporated herein in its entirety by reference hereto.

In embodiments, the invention is directed to a method for forming polymer particles having a core and a shell, wherein the method comprises: polymerizing a first monomer emulsion containing at least one cross-linker to form cross-linked core particles; and polymerizing a second monomer emulsion in the presence of the cross-linked core particles to form a linear non-cross-linked shell on the cross-linked core particles.

In embodiments of the invention, the first and second monomer emulsions each comprise styrene monomer and acrylic monomer, and the first monomer emulsion further comprises at least one cross-linker.

In embodiments of the invention, styrene monomer is included in the first and second monomer emulsions in amounts greater than about 15 weight percent based on the amount of monomer in the emulsion. Preferably, the amount of styrene monomer is from about 15 to about 85 weight percent, more preferably from about 60 to about 85 weight percent, based on the amount of monomer in the emulsion.

In embodiments of the invention, acrylic monomer is included in the first and second monomer emulsions in amounts greater than about 15 weight percent based on the amount of monomer in the emulsion. Preferably, the amount of acrylic monomer is from about 15 to about 85 weight percent, more preferably from about 15 to about 40 weight percent, based on the amount of monomer in the emulsion.

In a particularly preferred embodiment, the monomers in the first and second emulsions comprise styrene, n-butyl acrylate and β-CEA. In preferred embodiments of the invention, the monomer contains from about 60 to about 80 weight percent styrene, about 15 to about 35 weight percent n-butyl acrylate and about 1 to about 5 weight percent β-CEA.

In embodiments, the first monomer emulsion comprises at least one cross-linker in an amount of from about 0.1 weight percent to about 40 weight percent, preferably from about 0.2 weight percent to about 20 weight percent, more preferably from about 0.2 weight percent to about 10 weight percent, based on the total weight of monomer in the first and second monomer emulsions. However, these values should not be considered to be limiting.

The present invention is also directed to toner formed using the polymer particles described herein. In embodiments, the present invention is directed to toner comprising coalesced aggregates of colorant and polymer particles, wherein the polymer particles comprise a cross-linked polymer core and a linear non-cross-linked polymer shell.

The present invention is also directed to a method for forming toner. In embodiments, the method comprises aggregating polymer particles of the present invention with colorant and coalescing the aggregates to form toner.

DETAILED DESCRIPTION OF PREFERRED EMBODIMENTS

Figure 1:
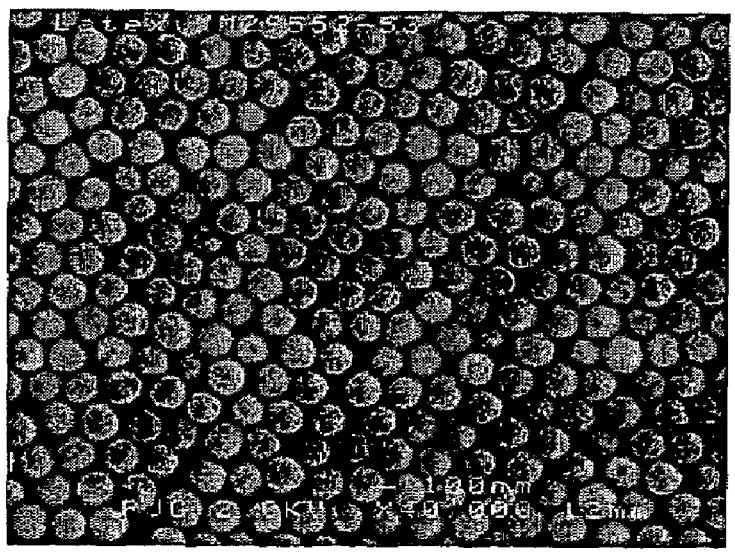
FIG. 1 depicts a scanning electron micrograph (SEM) image of Latex K formed in Example 11.

The polymer particles of the present invention, which contain a core and a shell, may be formed by a multi-stage emulsion polymerization process. In particular, the polymer particles may be formed by preparing a first emulsion of monomers in water, including at least one cross-linker, and a second emulsion of monomers in water that does not contain cross-linker; mixing a polymerization initiator with a portion of the first monomer emulsion to initiate polymerization, thus forming seed polymer; adding additional monomer from the first monomer emulsion to the composition and polymerizing the additional monomer to form the polymer core; and adding monomer from the second monomer emulsion to the composition and polymerizing the additional monomer to form the polymer shell.

The monomers are generally pre-mixed with water to form a stable emulsion. The emulsification may be accomplished at a temperature of about 5° C. to about 40° C. However, the emulsion may also be formed at higher temperatures. To form an emulsion, the mixture is generally agitated at, for example, at least 100 rpm, and preferably at least 400 rpm, for sufficient time to form a stable emulsion. The time required to form a stable emulsion is generally less if the mixture is agitated at a higher speed. In addition, the agitation speed may even be less than 100 rpm if the agitation is continued for a sufficient amount of time.

A chain transfer agent may be added to the monomer emulsion to control the molecular weight properties of the polymer to be formed. Chain transfer agents that may be used in the present invention include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chain transfer agents may be used in any effective amount, such as from about 0.1 to about 10 percent by weight of the monomer in the monomer emulsion.

In addition, surfactants may be added to the monomer emulsion to stabilize the emulsion. The surfactants that may be added include ionic and/or nonionic surfactants.

Nonionic surfactants that may be used include, but are not limited to, dialkylphenoxypoly(ethyleneoxy) ethanol, available from Rhone-Poulenac as IGEPAL CA-210.™, IGEPAL CA-520.™, IGEPAL CA-720.™, IGEPAL CO-890.™, IGEPAL CO-720.™, IGEPAL CO-290.™, IGEPAL CA-210.™, ANTAROX 890.™ and ANTAROX 897.™. An effective concentration of the nonionic surfactant is in embodiments, for example, from about 0.01 to about 10 percent by weight, and preferably from about 0.1 to about 5 percent by weight of the monomers used to prepare the polymer particles.

Examples of ionic surfactants include anionic and cationic surfactants with examples of anionic surfactants being, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R.™, NEOGEN SC.™ obtained from Kao, and the like. An effective concentration of the anionic surfactant generally employed is, for example, from about 0.01 to about 10 percent by weight, and preferably from about 0.1 to about 5 percent by weight of monomers used to prepare the polymer particles.

Examples of the cationic surfactants, which are usually positively charged, include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL.™ and ALKAQUAT.™ available from Alkaril Chemical Company, SANIZOL.™ (alkyl benzalkonium chloride), available from Kao Chemicals, and the like, and mixtures thereof. This surfactant is utilized in various effective amounts, such as for example from about 0.1 percent to about 5 percent by weight of water.

Suitable initiators include, but are not limited to, ammonium persulfate, potassium persulfate, sodium persulfate, ammonium persulfite, potassium persulfite, sodium persulfite, ammonium bisulfate, sodium bisulfate, 1,1'-azobis(1-methylbutyronitrile-3-sodium sulfonate), 4,4'-azobis(4-cyanovaleric acid), hydrogen peroxide, t-butyl hydroperoxide, cumene hydroperoxide, para-methane hydroperoxide, benzoyl peroxide, tert-butyl peroxide, cumyl peroxide, 2,2'-azobisisobutyronitrile, 2,2'-azobis(2-methylbutyronitrile), 2,2'-azobis(2-amidinopropane)dihydrochloride, 2,2'-azobisisobutyl amide dihydrate, 2,2'-azobis[2-(2-imidazolin-2-yl)propane]dihydrochloride, and 2,2'-azobis[2-(5-methyl-2-imidazolin-2-yl)propane]dihydrochloride. Preferably, the initiator is a persulfate initiator such as ammonium persulfate, potassium persulfate, sodium persulfate and the like. The initiator is generally added as part of an initiator solution in water. The amount of initiator used to form the polymer layer is generally from about 0.1 to about 10 percent by weight of the monomer to be polymerized.

The emulsion polymerization may be conducted at a temperature of from about 35° C. to about 125° C. The portion of the monomer used to form the seed polymer may be from about 0.5 to about 50 percent by weight of the total amount of monomer used to prepare the polymer particles. Preferably, the amount of monomer used to form the seed polymer is from about 3 to 25 percent by weight of the total amount of monomer used to form the polymer particles.

Additional monomer is then sequentially added to the seed polymer to form the core particles and then to form the polymer shell. The emulsion polymerization at each stage may be conducted at a temperature of from about 35° C. to about 125° C. The additional monomer may be fed to the composition at an effective time period of, for example, 0.5 to 10 hours, preferably 2 to 6 hours. The additional monomer may be in the form of a monomer emulsion. In addition, additional initiator, chain transfer agent and/or surfactant may or may not be added after the seed polymer is formed.

Illustrative examples of polymers that may be in the polymer particles described herein include, but are not limited to, known polymers such as poly(styrene-butadiene), poly(methyl methacrylate-butadiene), poly(ethyl methacrylate-butadiene), polylpropyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like.

In embodiments, the present invention is directed to processes for the preparation of toner from the polymer particles of the present invention. In particular, the layered particles of the present invention may be used to form toner by conventional techniques. Conventional techniques for forming toner are described in, for example, U.S. Pat. No. 5,397,671, the entire disclosure of which is hereby incorporated by reference. For example, the polymer particles may be melt kneaded or extruded with a colorant and the product thereof may be micronized and pulverized to provide toner particles.

Alternatively, the toner of the present invention may be formed by emulsion aggregation techniques. In particular, the process may comprise blending a colorant, preferably a colorant dispersion, more preferably containing a pigment, such as carbon black, phthalocyanine, quinacridone or RHODAMINE B.™ type, with polymer particles prepared as illustrated herein and optionally with a flocculate and/or charge additives; heating the resulting flocculate mixture at a temperature below the $T_g$ of the latex polymer, preferably from about 25° C. to about 1° C. below the $T_g$ of the latex polymer, for an effective length of time of, for example, 0.5 hour to about 2 hours, to form toner sized aggregates; subsequently heating the aggregate suspension at a temperature at or above the $T_g$ of the latex polymer, for example from about 60° C. to about 120° C., to effect coalescence or fusion, thereby providing toner particles; and isolating the toner product, such as by filtration, thereafter optionally washing and drying the toner particles, such as in an oven, fluid bed dryer, freeze dryer, or spray dryer.

The polymer particles are generally present in the toner compositions in various effective amounts, such as from about 75 weight percent to about 98 weight percent by weight of the toner. However, other effective amounts of polymer particles may be selected in embodiments.

Colorants include pigments, dyes, and mixtures of pigments with dyes, and the like. The colorant is generally present in the toner in an effective amount of, for example, from about 1 to about 15 weight percent by weight of toner, and preferably in an amount of from about 3 to about 10 weight percent by weight of the toner.

Illustrative examples of colorants, such as pigments, that may be used in the processes of the present invention include, but are not limited to, carbon black, such as REGAL 330.R™; magnetites, such as Mobay magnetites MO8029.™, MO8060.™; Columbian magnetites; MAPICO BLACKS.™ and surface treated magnetites; Pfizer magnetites CB4799.™, CB5300.™, CB5600.™, MCX6369.™; Bayer magnetites, BAYFERROX 8600.™, 8610.™; Northern Pigments magnetites, NP-604.™, NP-608.™; Magnox magnetites TMB-100.™, or TMB-104.™; and the like. Colored pigments or dyes, including cyan, magenta, yellow, red, green, brown, blue and/or mixtures thereof, may also be used. Generally, cyan, magenta, or yellow pigments or dyes, or mixtures thereof, are used. The pigment or pigments are generally used as water based pigment dispersions.

Specific examples of pigments include, but are not limited to, SUNSPERSE 6000™, FLEXIVERSE™ and AQUATONE™ water based pigment dispersions from SUN Chemicals, HELIOGEN BLUE L6900.™, D6840.™, D7080.™, D7020.™, PYLAM OIL BLUE.™, PYLAM OIL YELLOW.™, PIGMENT BLUE 1.™ available from Paul Uhlich & Company, Inc., PIGMENT VIOLET 1.™, PIGMENT RED 48.™, LEMON CHROME YELLOW DCC 1026.™, E.D. TOLUIDINE RED.™ and BON RED C.™ available from Dominion Color Corporation, Ltd., Toronto, Ontario, NOVAPERM YELLOW FGL.™, HOSTAPERM PINK E.™ from Hoechst, and CINQUASIA MAGENTA.™ available from E.I. DuPont de Nemours & Company, and the like. Examples of magentas include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK.™, and cyan components may also be selected as pigments in the processes of the present invention.

Flocculates may be used in effective amounts of, for example, from about 0.01 percent to about 10 percent by weight of the toner. Flocculants that maybe used include, but are not limited to, polyaluminum chloride (PAC), dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL.™ and ALKAQUAT.™ available from Alkaril Chemical Company, SANIZOL.™ (benzalkonium chloride), available from Kao Chemicals,. and the like.

Charge additives may also be used in suitable effective amounts of, for example, from 0.1 to 5 weight percent by weight of the toner. Suitable charge additives include, but are not limited to, alkyl pyridinium halides, bisulfates, the charge control additives of U.S. Pat. Nos. 3,944,493; 4,007,293; 4,079,014; 4,394,430 and 4,560,635, which illustrate a toner with a distearyl dimethyl ammonium methyl sulfate charge additive, the entire disclosures of which are hereby incorporated by reference, negative charge enhancing additives like aluminum complexes, and the like.

The following examples illustrate specific embodiments of the present invention. One skilled in the art will recognize that the appropriate reagents and component ratios/concentrations may be adjusted as necessary to achieve specific product characteristics. All parts and percentages are by weight unless otherwise indicated.

EXAMPLE 1

Preparation of Latex A: Core/Shell Latex Containing 10% Core/90% Shell with 1.23% by Weight Cross-linker to Monomer A latex emulsion comprised of cross-linked core and linear shell polymer particles generated from the semi-continuous emulsion polymerization of styrene, n-butyl acrylate and beta-CEA was prepared as follows. The procedure given below is for the 2 L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2 L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 250 mL beaker, the 10 percent emulsified core monomer solution was prepared by adding 35.1 grams of styrene, 18.9 grams of n-butyl acrylate, 1.62 grams of β-CEA, 6.64 grams of divinylbenzene, 25.7 grams of de-ionized water and 1.09 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1 L beaker, the emulsified shell monomer solution was prepared by adding 371.79 grams of styrene, 114.21 grams of n-butyl acrylate, 14.58 grams of β-CEA, 7.48 grams of 1-dodecanethiol, 1.70 grams of 1,10-decanediol diacrylate, 231.3 grams of de-ionized water and 9.80 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 76.5 to 23.5 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 3.24 grams per minute. Once all the core monomer emulsion was charged into the reactor, the shell emulsified monomer solution was fed into the reactor at a controlled fed rate of 3.03 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=29,100 and Mn=12,200 and the onset Tg was 46.1° C. The average particle size of the latex as measured by NICOMP particle sizer was 222 nanometers and residual monomer as measured by GC was 81 ppm for styrene and <100 ppm for n-butyl acrylate. A portion of the latex was dried on the freeze dryer and the rheology of the material was measured.

EXAMPLE 2

Preparation of Latex B: Core/Shell Latex Containing 20% Core/80% Shell with 1.23% by Weight Cross-linker to Monomer A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 250 mL beaker, the 20 percent emulsified core monomer solution was prepared by adding 70.2 grams of styrene, 37.8 grams of n-butyl acrylate, 3.24 grams of β-CEA, 6.64 grams of divinylbenzene, 51.4 grams of de-ionized water and 2.18 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1 L beaker, the emulsified shell monomer solution was prepared by adding 330.48 grams of styrene, 101.52 grams of n-butyl acrylate, 12.96 grams of β-CEA, 6.65 grams of 1-dodecanethiol, 1.51 grams of 1,10-decanediol diacrylate, 205.6 grams of de-ionized water and 8.71 grams of Dowfax 2A1 surfactant. Similar to the core monomer solution, the shell monomer and surfactant mixture was emulsified by stirring to produce a very stable emulsified monomer mixture. For the shell monomer emulsion, the ratio of styrene to n-butyl acrylate was 76.5 to 23.5 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 2.28 grams per minute. Once all the core monomer emulsion was charged into the reactor, the shell emulsified monomer solution was fed into the reactor at a controlled fed rate of 3.2 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=31,400 and Mn=13,100 and the onset Tg was 52.1° C. The average particle size of the latex as measured by NICOMP particle sizer was 186 nanometers and residual monomer as measured by GC was 114 ppm for styrene and <100 ppm for n-butyl acrylate. A portion of the latex was dried on the freeze dryer and the rheology of the material was measured.

EXAMPLE 3

Preparation of Latex C: Core/Shell Latex Containing 30% Core/70% Shell with 1.23% by Weight Cross-linker to Monomer A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 600 mL beaker, the 30 percent emulsified core monomer solution was prepared by adding 105.3 grams of styrene, 56.7 grams of n-butyl acrylate, 4.86 grams of β-CEA, 6.64 grams of divinylbenzene, 77.1 grams of de-ionized water and 3.27 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable mixture. In a 1 L beaker, the emulsified shell monomer solution was prepared by adding 289.17 grams of styrene, 88.83 grams of n-butyl acrylate, 11.34 grams of β-CEA, 5.82 grams of 1-dodecanethiol, 1.32 grams of 1,10-decanediol diacrylate, 179.9 grams of de-ionized water and 7.62 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 76.5 to 23.5 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 3.43 grams per minute. Once all the core monomer emulsion was charged into the reactor, the shell emulsified monomer solution was fed into the reactor at a controlled fed rate of 2.78 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=29,600 and Mn=12,300 and the onset Tg was 50.1° C. The average particle size of the latex as measured by NICOMP particle sizer was 203 nanometers and residual monomer as measured by GC was 395 ppm for styrene and 163 ppm for n-butyl acrylate. A portion of the latex was dried on the freeze dryer and the rheology of the material was measured.

EXAMPLE 4

Preparation of Latex D: Core Shell Latex Containing 40% Core 60% Shell with 1.23% by Weight Cross-linker to Monomer A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 600 mL beaker, the 40 percent emulsified core monomer solution was prepared by adding 140.4 grams of styrene, 75.6 grams of n-butyl acrylate, 6.48 grams of β-CEA, 6.64 grams of divinylbenzene, 102.8 grams of de-ionized water and 4.36 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1 L beaker, the emulsified shell monomer solution was prepared by adding 247.86 grams of styrene, 76.14 grams of n-butyl acrylate, 9.72 grams of, β-CEA, 4.99 grams of 1-dodecanethiol, 1.1 grams of 1,10-decanediol diacrylate, 154.2 grams of de-ionized water and 6.53 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 76.5 to 23.5 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 2.21 grams per minute. Once all the core monomer emulsion was charged into the reactor, the shell emulsified monomer solution was fed into the reactor at a controlled fed rate of 3.23 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=38,900 and Mn=15,500 and the onset Tg was 46.5° C. The average particle size of the latex as measured by NICOMP particle sizer was 192 nanometers and residual monomer as measured by GC was 395 ppm for styrene and 163 ppm for n-butyl acrylate. A portion of the latex was dried on the freeze dryer and the rheology of the material was measured.

EXAMPLE 5

Preparation of Latex E: 10% Core/90% Shell, 1.23% Cross-linker, 79% Styrene in Shell A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 100 mL beaker, the 10 percent emulsified core monomer solution was prepared by adding 35.1 grams of styrene, 18.9 grams of n-butyl acrylate, 1.62 grams of β-CEA, 6.64 grams of divinylbenzene, 25.7 grams of de-ionized water and 1.09 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1 L beaker, the emulsified shell monomer solution was prepared by adding 383.94 grams of styrene, 102.06 grams of n-butyl acrylate, 14.58 grams of β-CEA, 7.48 grams of 1-dodecanethiol, 1.70 grams of 1,10-decanediol diacrylate, 231.3 grams of de-ionized water and 9.80 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 79 to 21 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 2.97 grams per minute. Once all the core monomer emulsion was charged into the reactor, the shell emulsified monomer solution was fed into the reactor at a controlled fed rate of 3.41 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=116,100 and Mn=15,500 and the onset Tg was 52.6° C. The average particle size of the latex as measured by NICOMP particle sizer was 215 nanometers and residual monomer as measured by GC was 133 ppm for styrene and <100 ppm for n-butyl acrylate. A portion of the latex was dried on the freeze dryer and the rheology of the material was measured.

EXAMPLE 6

Preparation of Latex F: 20% Core/80% Shell, 1.23% Cross-linker, 79% Styrene in Shell A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 250 mL beaker, the 20 percent emulsified core monomer solution was prepared by adding 70.2 grams of styrene, 37.8 grams of n-butyl acrylate, 3.24 grams of β-CEA, 6.64 grams of divinylbenzene, 51.4 grams of de-ionized water and 2.178 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1L beaker, the emulsified shell monomer solution was prepared by adding 341.28 grams of styrene, 90.72 grams of n-butyl acrylate, 12.96 grams of β-CEA, 6.65 grams of 1-dodecanethiol, 1.51 grams of 1,10-decanediol diacrylate, 205.6 grams of de-ionized water and 8.71 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 79 to 21 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 3.12 grams per minute. Once all the core monomer emulsion was charged into the reactor, the shell emulsified monomer solution was fed into the reactor at a controlled fed rate of 3.26 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=31,300 and Mn=13,500 and the onset Tg was 52.2° C. The average particle size of the latex as measured by NICOMP particle sizer was 191 nanometers and residual monomer as measured by GC was 577 ppm for styrene and 173 ppm for n-butyl acrylate. A portion of the latex was dried on the freeze dryer and the rheology of the material was measured.

EXAMPLE 7

Preparation of Latex G: 30% Core/70% Shell, 1.23% Cross-linker, 79% Styrene in Shell A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 600 mL beaker, the 30 percent emulsified core monomer solution was prepared by adding 105.3 grams of styrene, 56.7 grams of n-butyl acrylate, 4.86 grams of β-CEA, 6.64 grams of divinylbenzene, 77.1 grams of de-ionized water and 3.27 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1L beaker, the emulsified shell monomer solution was prepared by adding 298.62 grams of styrene, 79.38 grams of n-butyl acrylate, 11.34 grams of β-CEA, 5.82 grams of 1-dodecanethiol, 1.32 grams of 1,10-decanediol diacrylate, 179.9 grams of de-ionized water and 7.62 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 79 to 21 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 2.49 grams per minute. Once all the core monomer emulsion was charged into the reactor, the shell emulsified monomer solution was fed into the reactor at a controlled fed rate of 2.52 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=30,500 and Mn=13,900 and the onset Tg was 49.3° C. The average particle size of the latex as measured by NICOMP particle sizer was 186 nanometers and residual monomer as measured by GC was 174 ppm for styrene and <100 ppm for n-butyl acrylate. A portion of the latex was dried on the freeze dryer and the rheology of the material was measured.

EXAMPLE 8

Preparation of Latex H: 40% Core/60% Shell, 1.23% Cross-linker, 79% Styrene in Shell A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 600 mL beaker, the 40 percent emulsified core monomer solution was prepared by adding 140.4 grams of styrene, 75.6 grams of n-butyl acrylate, 6.48 grams of β-CEA, 6.64 grams of divinylbenzene, 102.8 grams of de-ionized water and 4.36 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1L beaker, the emulsified shell monomer solution was prepared by adding 255.96 grams of styrene, 68.04 grams of n-butyl acrylate, 9.72 grams of β-CEA, 4.99 grams of 1-dodecanethiol, 1.1 grams of 1,10-decanediol diacrylate, 154.2 grams of de-ionized water and 6.53 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 79 to 21 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 3.20 grams per minute. Once all the core monomer emulsion was charged into the reactor, the shell emulsified monomer solution was fed into the reactor at a controlled fed rate of 3.03 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=38,300 and Mn=15,100 and the onset Tg was 46.3° C. The average particle size of the latex as measured by NICOMP particle sizer was 189 nanometers and residual monomer as measured by GC was 230 ppm for styrene and 130 ppm for n-butyl acrylate. A portion of the latex was dried on the freeze dryer and the rheology of the material was measured.

EXAMPLE 9

Preparation of Latex I: 10% Core/90% Shell, 1.5% Cross-linker, 79% Styrene in Shell A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 100 mL beaker, the 10 percent emulsified core monomer solution was prepared by adding 35.1 grams of styrene, 18.9 grams of n-butyl acrylate, 1.62 grams of β-CEA, 8.1 grams of divinylbenzene, 25.7 grams of de-ionized water and 1.09 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1 L beaker, the emulsified shell monomer solution was prepared by adding 383.94 grams of styrene, 102.1 grams of n-butyl acrylate, 14.58 grams of β-CEA, 7.48 grams of 1-dodecanethiol, 1.70 grams of 1,10-decanediol diacrylate, 231.3 grams of de-ionized water and 9.80 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 79 to 21 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 3.21 grams per minute. Once all the core monomer emulsion was charged into the reactor, the shell emulsified monomer solution was fed into the reactor at a controlled fed rate of 3.04 grams per minute. Once all the shell monomer solution was added the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw 35,300 and Mn=14,500 and the onset Tg was 54.6° C. The average particle size of the latex as measured by NICOMP particle sizer was 251 nanometers and residual monomer as measured by GC was 230 ppm for styrene and 148 ppm for n-butyl acrylate. A portion of the latex was dried on the freeze dryer and the rheology of the material was measured.

EXAMPLE 10

Preparation of Latex J: 30% Core/70% Shell, 1.5% Cross-linker, 79% Styrene in Shell A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2AI (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 600 mL beaker, the 30 percent emulsified core monomer solution was prepared by adding 105.3 grams of styrene, 56.7 grams of n-butyl acrylate, 4.86 grams of β-CEA, 8.1 grams of divinylbenzene, 77.1 grams of de-ionized water and 3.27 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1 L beaker, the emulsified shell monomer solution was prepared by adding 298.62 grams of styrene, 79.38 grams of n-butyl acrylate, 11.34 grams of β-CEA, 5.82 grams of 1-dodecanethiol, 1.32 grams of 1,10-decanediol diacrylate, 179.9 grams of de-ionized water and 7.62 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 79 to 21 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of 3.40 grams per minute. Once all the core monomer/-emulsion was charged into the reactor, the shell emulsified monomer solution was fed into the reactor at a controlled fed rate of 3.24 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=32,300 and Mn=12,700 and the onset Tg was 49.3° C. The average particle size of the latex as measured by NICOMP particle sizer was 198 nanometers and residual monomer as measured by GC was 217 ppm for styrene and 185 ppm for n-butyl acrylate. A portion of the latex was dried on the freeze dryer and the rheology of the material was measured.

EXAMPLE 11

Preparation of Latex K: 30% Core/70% Shell Latex, 0.3% Cross-linker, 76.5% Styrene in Shell A latex emulsion comprised of cross-linked core and linear shell polymer particles generated from the semi-continuous emulsion polymerization of styrene, n-butyl acrylate and beta-CEA was prepared as follows. The procedure given below is for the 2L scale reaction.

A surfactant solution consisting of 0.6 grams Dowfax 2A1 (anionic emulsifier) and 514 grams de-ionized water was prepared by mixing for 10 minutes in a beaker. The surfactant solution was poured into the 2L Buchi reactor and the reactor was then continuously purged with nitrogen while being stirred at 300 RPM. The reactor was then heated up to 76° C. at a controlled rate and held constant. In a separate container, 8.1 grams of ammonium persulfate initiator was dissolved in 45 grams of de-ionized water. In a 600 mL beaker, the 30 percent emulsified core monomer solution was prepared by adding 105.3 grams of styrene, 56.7 grams of n-butyl acrylate, 4.86 grams of β-CEA, 1.62 grams of divinylbenzene, 77.1 grams of de-ionized water and 3.27 grams of Dowfax 2A1 surfactant. The ratio of monomers for the core was 65 percent styrene, 35 percent n-butyl acrylate and 3 percent of all total monomer of β-CEA. The monomer and surfactant solution was emulsified by stirring to produce a stable solution. In a 1 L beaker, the emulsified shell monomer solution was prepared by adding 289.17 grams of styrene, 88.83 grams of n-butyl acrylate, 11.34 grams of P-CEA, 5.82 grams of 1-dodecanethiol, 1.32 grams of 1,10-decanediol diacrylate, 179.9 grams of de-ionized water and 7.62 grams of Dowfax 2A1 surfactant. Similar to the core monomer solution, the shell monomer and surfactant mixture was emulsified by stirring to produce a very stable emulsified monomer solution. For the shell monomer emulsion, the ratio of styrene to n-butyl acrylate was 76.5 to 23.5 percent by weight. One percent of the emulsified core monomer solution was slowly fed into the reactor containing the aqueous surfactant phase at 76° C. to form the "seeds" of the latex while being purged with nitrogen. The initiator solution was then slowly charged into the reactor and after 20 minutes the rest of the emulsified core mixture was continuously fed in using a metering pump at a rate of approximately 3.0 grams per minute. Once all the core monomer emulsion was charged into the reactor, the shell emulsified monomer solution was fed into the reactor at a controlled fed rate of approximately 3.0 grams per minute. Once all the shell monomer solution was added, the reactor temperature was held at 76° C. for an additional 3 hours to complete the reaction. Full cooling was then applied and the reactor temperature was reduced to 35° C. The product was discharged and filtered through a 63 micron screen. After drying a portion of the latex, the molecular weight properties were measured to be Mw=57,700 and Mn=17,100 and the onset Tg was 47.8° C. The average particle size of the latex as measured by NICOMP particle sizer was 171 nanometers and residual monomer as measured by GC was 232 ppm for styrene and 189 ppm for n-butyl acrylate. A portion of the latex was dried on the freeze dryer and the rheology of the material was measured.

A summary of Latexes A-K, as formed in Examples 1-11, is provided in Table 1.

TABLE 1

| Latex ID | % Core | Core (S/BA/bCEA) | DVB in Core (g)/% DVB of All Latex Monomer | % Shell | Shell (S/BA/bCEA) | Feed Rate of Core | Feed Rate of Shell |
|---|---|---|---|---|---|---|---|
| A | 10 | 65/35/3 | 6.64 g/1.23% | 90 | 76.5/23.5/3 | 3.24 g/min | 3.03 g/min |
| B | 20 | 65/35/3 | 6.64 g/1.23% | 80 | 76.5/23.5/3 | 2.28 g/min | 3.2 g/min |
| C | 30 | 65/35/3 | 6.64 g/1.23% | 70 | 76.5/23.5/3 | 3.43 g/min | 2.78 g/min |
| D | 40 | 65/35/3 | 6.64 g/1.23% | 60 | 76.5/23.5/3 | 2.21 g/min | 3.23 g/min |
| E | 10 | 65/35/3 | 6.64 g/1.23% | 90 | 79/21/3 | 2.97 g/min | 3.41 g/min |
| F | 20 | 65/35/3 | 6.64 g/1.23% | 80 | 79/21/3 | 3.12 g/min | 3.26 g/min |
| G | 30 | 65/35/3 | 6.64 g/1.23% | 70 | 79/21/3 | 2.49 g/min | 2.52 g/min |
| H | 40 | 65/35/3 | 6.64 g/1.23% | 60 | 79/21/3 | 3.20 g/min | 3.03 g/min |
| I | 10 | 65/35/3 | 8.1 g/1.5% | 90 | 79/21/3 | 3.40 g/min | 3.24 g/min |
| J | 30 | 65/35/3 | 8.1 g/1.5% | 70 | 79/21/3 | 3.40 g/min | 3.24 g/min |
| K | 30 | 65/35/3 | 1.62 g/0.3% | 70 | 76.5/23.5/3 | ~3 g/min | ~3 g/min |

Scanning Electron Micrographs of Latexes

Figure 2:
FIG. 2 depicts an SEM image of Latex C formed in Example 3.

The effect of cross-linking monomer concentration is depicted in FIGS. 1 and 2, which are scanning electron micrograph (SEM) images. In particular, when the weight percent of cross-linking monomer, divinylbenzene, is low, such as in Example 11 (Latex K), which contains only 1.62 grams (0.3% of toner latex monomer) cross-linking monomer, the latex particles, are of uniform shape and very spherical as illustrated in FIG. 1. In contrast, as illustrated in FIG. 2, Latex C (Example 3) has a morphology that is more elongated and less spherical. Both latexes are composed of 30% cross-linked core and 70% linear latex shell.

Figure 3A:
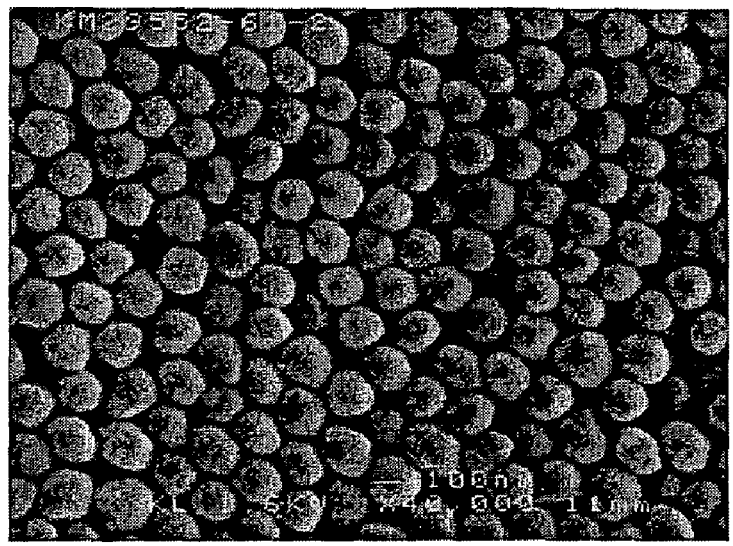
FIGS. 3A and B depict SEM images of Latex E formed in Example 5 and Latex H formed in Example 8, respectively.
Figure 3B:
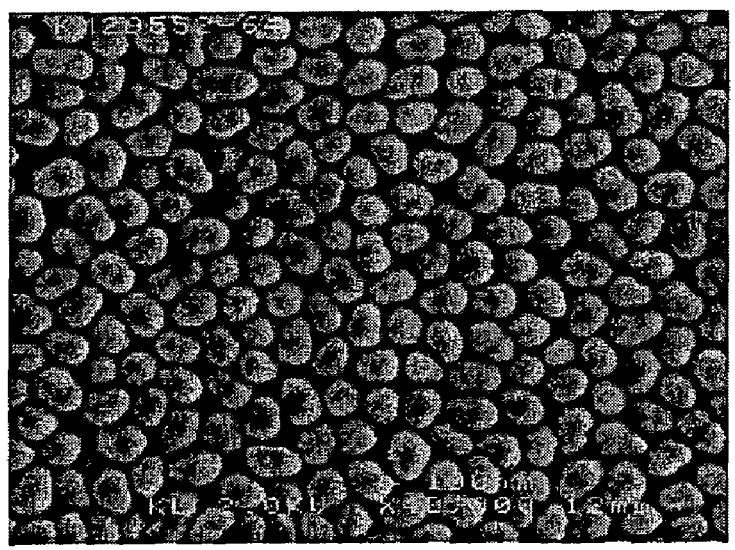

In the of latexes described in Examples 5-8 (Latexes E-H), the amount of divinylbenzene cross-linker added into the core of the latex remained the same at 6.64 grams, but the ratio of core to shell was changed from 10/90 in Latex E (FIG. 3A) to 40/60 in Latex H (FIG. 3B). This increase in the portion of cross-linked latex effects the morphology of the particles such that a smaller amount of cross-linked core (10% in FIG. 3A) results in more spherical particles with a narrower particle size compared to a larger cross-linked core (40% in FIG. 3B), which results in more irregular elongated particles with a wider particle size distribution.

COMPARATIVE EXAMPLE 1

Preparation of Linear Latex latex emulsion comprised of polymer particles generated from the emulsion polymerization of styrene, n-butyl acrylate and beta-CEA was prepared as follows. This reaction was preformed at the 300 gallon scale.

A surfactant solution consisting of 605 grams Dowfax 2A1 (anionic emulsifier) and 387 kg de-ionized water was prepared by mixing for 10 minutes in a stainless steel holding tank. The holding tank was then purged with nitrogen for 5 minutes before transferring into the reactor. The reactor was then continuously purged with nitrogen while being stirred at 100 RPM. The reactor was then heated up to 80° C. at a controlled rate and held there. Separately 6.1 kg of ammonium persulfate initiator was dissolved in 30.2 kg of de-ionized water. Separately the monomer emulsion was prepared in the following manner. 311.4 kg of styrene, 95.6 kg of n-butyl acrylate and 12.21 kg of β-CEA, 2.88 kg of 1-dodecanethiol, 1.42 kg of ADOD, 8.04 kg of Dowfax 2A1(anionic surfactant), and 193 kg of deionized water were mixed to form an emulsion. 1% of the above emulsion was then slowly fed into the reactor containing the aqueous surfactant phase at 80° C. to form the particle "seeds" while being purged with nitrogen. The initiator solution is then slowly charged into the reactor and after 10 minutes the rest of the emulsion is continuously fed in using a metering pump at a rate of 0.5%/min. Once all the monomer emulsion is charged into the main reactor, the temperature was held at 80° C. for an additional 2 hours to complete the reaction. Full cooling was then applied and the reactor temperature was reduced to 35° C. The product is collected into a holding tank. After drying the latex the molecular properties were Mw=35,419 and Mn=11,354 and the onset Tg was 51.0C.

Preparation of Cross-linked Gel Latex

A latex emulsion comprised of polymer gel particles generated from the semi-continuous emulsion polymerization of styrene, n-butyl acrylate, divinylbenzene, and beta-CEA was prepared as follows. This reaction was performed at the 100 gallon scale.

A surfactant solution consisting of 1.75 kilograms Neogen RK (anionic emulsifier) and 145.8 kilograms de-ionized water was prepared by mixing for 10 minutes in a stainless steel holding tank. The holding tank was then purged with nitrogen for 5 minutes before transferring into the reactor. The reactor was then continuously purged with nitrogen while being stirred at 300 RPM. The reactor was then heated up to 76° C. at a controlled rate and held constant. In a separate container, 1.24 kilograms of ammonium persulfate initiator was dissolved in 13.12 kilograms of de-ionized water. Also in a second separate container, the monomer emulsion was prepared in the following manner. 47.39 kilograms of styrene, 25.52 kilograms of n-butyl acrylate, 2.19 kilograms of β-CEA, and 729 grams of 55% grade divinylbenzene, 4.08 kilograms of Neogen RK (anionic surfactant), and 78.73 kilograms of deionized water were mixed to form an emulsion. The ratio of styrene monomer to n-butyl acrylate monomer by weight was 65 to 35 percent. One percent of the above emulsion is then slowly fed into the reactor containing the aqueous surfactant phase at 76° C. to form the "seeds" while being purged with nitrogen. The initiator solution was then slowly charged into the reactor and after 20 minutes the rest of the emulsion is continuously fed in using metering pumps.

Once all the monomer emulsion is charged into the main reactor, the temperature is held at 76° C. for an additional 2 hours to complete the reaction. Full cooling was then applied and the reactor temperature is reduced to 35° C. The product is collected into a holding tank after filtration through a 1 micron filter bag. After drying a portion of the latex, the molecular properties were measured to be Mw=134,700 and Mn=27,300 and the onset Tg was 43.0° C. The average particle size of the latex as measured by Disc Centrifuge was 48 nanometers and residual monomer as measured by GC was <50 ppm for styrene and <100 ppm for n-butyl acrylate.

This latex is 10 weight percent cross-linked.

Mixing of Latexes

The Linear Latex and the 10 weight percent Cross-linked Gel Latex were then mixed together as solutions in a ratio of 1:7.1 (Cross-linked Gel: Linear) and then dried on the freeze dryer to produce free flowing powder. The amount of total DVB in this ratio is 1.23 weight percent which is an equivalent amount of cross-linking as a majority of the core/shell latexes described in Examples 1-11.

Rheology

The rheology of the core/shell latexes (Examples 1-11) was measured and compared to a control latex mixture (Comparative Example 1).

Figure 4:
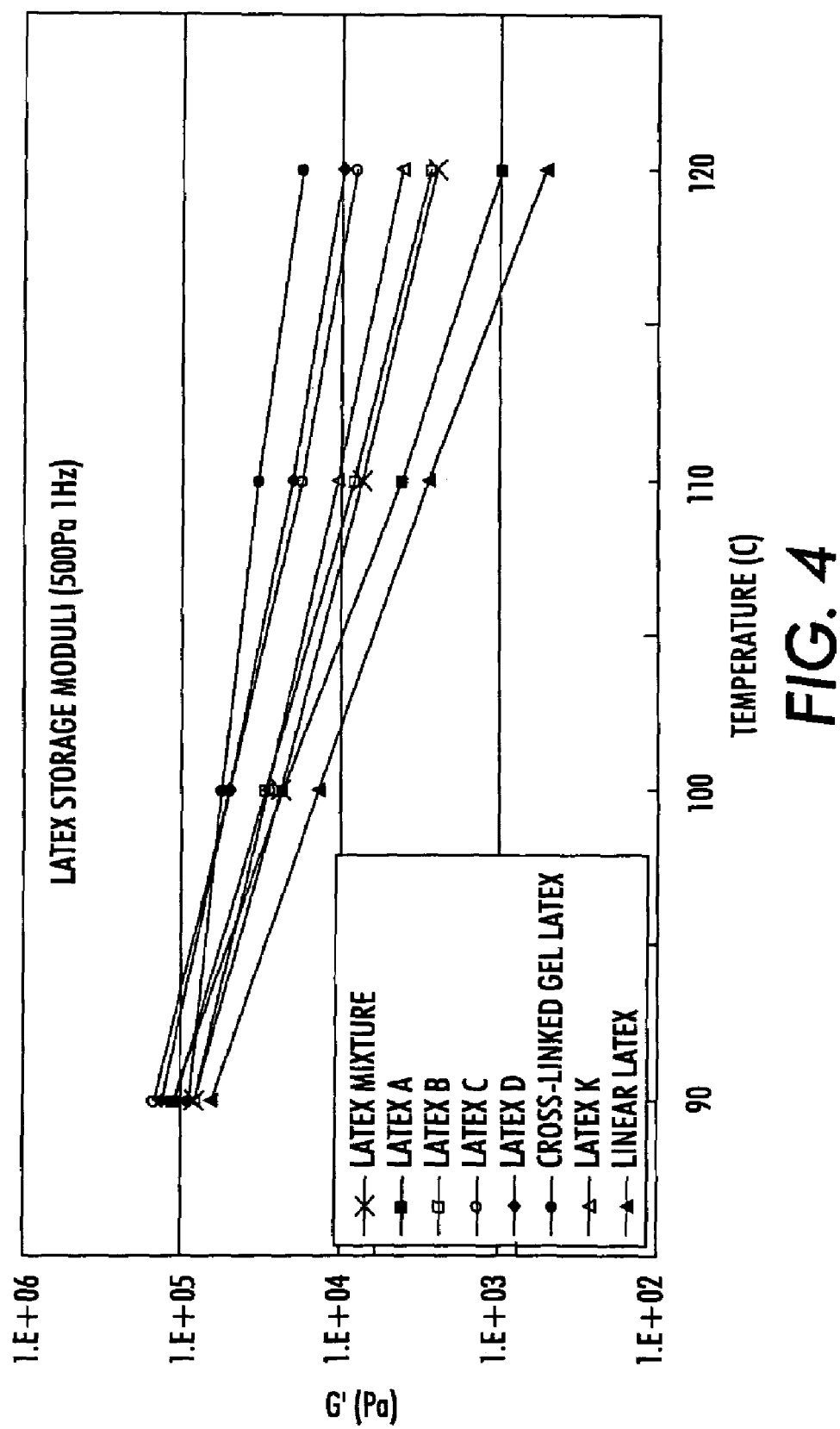
FIG. 4 depicts the storage moduli rheological properties for Latexes A-D and K formed in Examples 1-4 and 11, respectively, as compared to the latex mixture formed in Comparative Example 1, as well as each of the two latex components (linear latex and cross-linked gel latex) of the latex mixture.

The measure of the storage moduli rheological properties for the core/shell latexes where the shell monomer ratio was 76.5% styrene/23.5% n-butyl acrylate/3% B-CEA by weight of total monomer (Latexes A-E of Examples 1-4) is shown in FIG. 4.

The control latex mixture of Comparative Example 1 contains the same weight percent of divinylbenzene (1.23%) as Latexes A-D (Examples 1-4), although in Latexes A-D, the DVB is in the core of every latex particle at either 10, 20, 30 or 40% by weight of the latex particle. As the percent of core increases, the cross-linking density within the core decreases. As the percent of cross-linked core increases, the storage module increases at a set temperature and a significant increase is possible at 40% core with respect to the control without having to increase the amount of cross-linker. Also noted is that a 20/80 ratio (Latex B) of core/shell latex consisting of 1.23% DVB has lower storage moduli than a 30/70 core/shell ratio (Latex K) at a much lower amount of DVB (0.3%). Also using this cross-linked core/linear shell latex design at only 0.3% DVB in a 30% core/70% shell latex, the rheology of this latex matches that of the control latex at 1.23% DVB.

Figure 5:
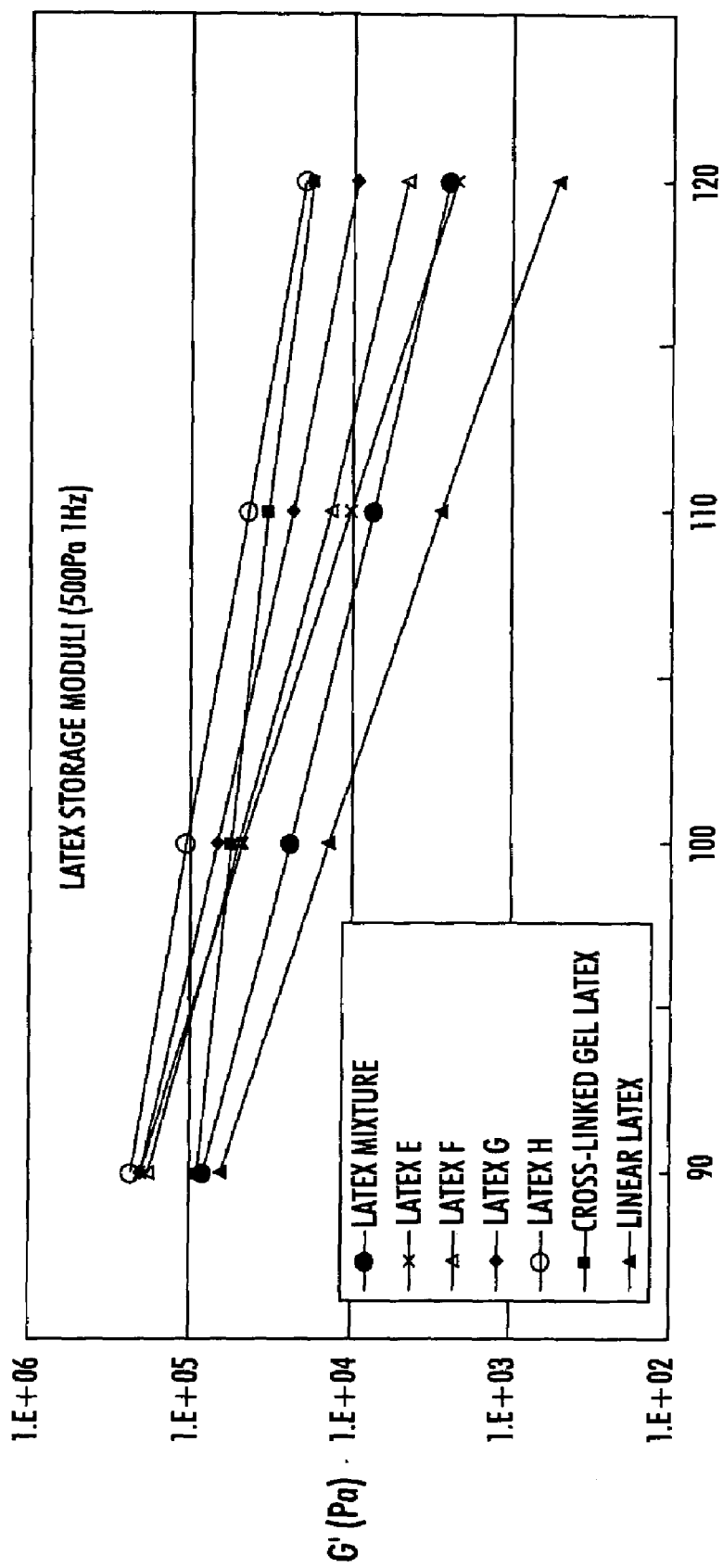
FIG. 5 depicts the storage moduli rheological properties for Latexes E-H formed in Examples 5-8, respectively, as compared to the latex mixture formed in Comparative Example 1, as well as each of the two latex components (linear latex and cross-linked gel latex) of the latex mixture.

The rheology of the two individual latexes (the Linear Latex and the Cross-linked Gel Latex of Comparative Example 1) are included in FIGS. 4 and 5 for comparison. As shown in FIG. 4, all of the core/shell latexes fall in between the Linear Latex and the 10 weight percent Cross-linked Gel Latex.

For Latexes E-H (Examples 5-8), the ratio of styrene in the linear shell is increased from 76.5% to 79%, which increases the latex Tg. A similar trend in the rheological properties as noted by the storage moduli is illustrated in FIG. 5. As the percent of cross-linked core increases, the storage module increase at a set temperature and a significant increase is possible at 40% core with respect to the control without having to increase the amount of cross-linker. By controlling where the cross-linking occurs within the latex particles and to what degree the latex is cross-linked, the Theological properties of the latexes can be controlled between the ranges of the Linear Latex and the Cross-linked Gel Latex of Comparative Example 1.

COMPARATIVE EXAMPLE 2

Preparation of Control Toner Particles

Into a 2 liter glass reactor equipped with an overhead stirrer and heating mantle was dispersed 191.4 grams of the Linear Latex formed in Comparative Example 1 having a 41.4 percent solids content, 75.0 grams of the Cross-linked Gel Latex formed in Comparative Example 1 containing 10 weight percent gel, 54.26 grams of POLYWAX 850 dispersion, EA-Wax-69 having a solids content of 30.60 percent, 114.04 grams of a Regal 330 carbon black dispersion WA1945 prepared by Sun Chemical having a solids content of 16.92 percent, 9.91 grams of a 1 percent calcium chloride dihydride solution into 479.1 grams of water with high shear stirring by means of a polytron. To this mixture was added 30.6 grams of a coagulant solution consisting of 10 weight percent poly(aluminiumchloride) (PAC) and 90 wt. % 0.02M $HNO_3$ solution. The PAC solution was added dropwise at low rpm and, as the viscosity of the pigmented latex mixture increased, the rpm of the polytron probe also increased to 5,000 rpm for a period of 2 minutes. This produced a flocculation or heterocoagulation of gelled particles consisting of nanometer sized latex particles, 9% wax and 10% pigment for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 124.6 grams of the Linear Latex formed in Comparative Example 1 was then introduced into the reactor while stirring. After an additional 30 minutes to 1 hour, the particle size measured was 5.65 microns with a GSDv of 1.18 and GSDn of 1.21. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 5.83 microns with a GSD by volume of 1.18 and GSD by number of 1.21. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was smooth and "potato" shape. The final particle size after cooling but before washing was 5.65 microns with a GSD by volume of 1.18 and GSD by number of 1.21. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 5.65 microns with $GSD_v$=1.18 and $GSD_n$=1.21. The glass transition temperature of this sample measured by DSC is Tg(onset)=52.4° C.

EXAMPLE 12

Preparation of Toner Particles from Core/Shell Latex K Containing 30% Core/70% Shell with 0.3% by Weight DVB to Monomer Into a 2 liter glass reactor equipped with an overhead stirrer and heating mantle was dispersed 258.4 grams of Latex K having a 42 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a 1 percent calcium chloride dihydride solution into 573.3 grams of water with high shear stirring by means of a polytron. To this mixture was added 34 grams of a coagulant solution consisting of 10 weight percent poly(aluminiumchloride) (PAC) and 90 wt. % 0.02M $HNO_3$ solution. The PAC solution was added drop-wise at low rpm and, as the viscosity of the pigmented latex mixture increased, the rpm of the polytron probe also increased to 5,000 rpm for a period of 2 minutes. This produced a flocculation or heterocoagulation of gelled particles consisting of nanometer sized latex particles, 9% wax and 10% pigment for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 136.5 grams of Latex K was then introduced into the reactor while stirring. After an additional 30 minutes to 1 hour, the particle size measured was 5.15 microns with a GSDv of 1.18 and GSDn of 1.21. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 5.13 microns with a GSD by volume of 1.18 and GSD by number of 1.21. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was smooth and "potato" shape with nm size gel protrusion or bumps on the toner surface. The final particle size after cooling but before washing was 5.25 microns with a GSD by volume of 1.18 and GSD by number of 1.21. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 5.39 microns with $GSD_v$=1.19 and $GSD_n$=1.23. The glass transition temperature of this sample was measured by DSC and found to have Tg(onset)=47.9° C. All developers were prepared with 35 microns IMAR carrier at TC 5% conditioned in A and C zones and charged up using the Turbula mixer. The q/d of parent toner after 60 minutes is −0.32 and −0.14 fC/microns in C and A zones. The A/C ratio the RH sensitivity indicator is 0.44.

EXAMPLE 13

Preparation of Toner Particles from Core/Shell Latex A Containing 10% Core/90% Shell with 1.23% by Weight DVB to Monomer Into a 2 liter glass reactor equipped with an overhead stirrer and heating mantle was dispersed 258.4 grams of Latex A having a 42 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a I percent calcium chloride dihydride solution into 573.3 grams of water with high shear stirring by means of a polytron. To this mixture was added 34 grams of a coagulant solution consisting of 10 weight percent poly(aluminium-chloride) (PAC) and 90 wt. % 0.02M HNO₃ solution. The PAC solution was added drop-wise at low rpm and, as the viscosity of the pigmented latex mixture increased, the rpm of the polytron probe also increased to 5,000 rpm for a period of 2 minutes. This produced a flocculation or hetero-coagulation of gelled particles consisting of nanometer sized latex particles, 9% wax and 10% pigment for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 136.5 grams of Latex A was then introduced into the reactor while stirring. After an additional 30 minutes to 1 hour, the particle size measured was 6.28 microns with a GSDv of 1.26 and GSDn of 1.45. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 6.97 microns with a GSD by volume of 1.28 and GSD by number of 1.42. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was smooth and "potato" shape with nm size gel protrusion or bumps on the toner surface. The final particle size after cooling but before washing was 6.85 microns with a GSD by volume of 1.28 and GSD by number of 1.41. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 6.75 microns with $GSD_v$=1.28 and $GSD_n$=1.41. The glass transition temperature of this sample was measured by DSC and found to have Tg(onset)=49.9° C. The q/d of parent toner after 60 minutes is −0.55 and −0.23 fC/microns in C and A zones. The A/C ratio the RH sensitivity indicator is 0.42.

EXAMPLE 14

Preparation of Toner Particles from Core/Shell Latex B Containing 20% Core 80% Shell with 1.23% by Weight DVB to Monomer Into a 2 liter glass reactor equipped with an overhead stirrer and heating mantle was dispersed 258.4 grams of Latex B having a 42 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a 1 percent calcium chloride dihydride solution into 573.3 grams of water with high shear stirring by means of a polytron. To this mixture was added 34 grams of a coagulant solution consisting of 10 weight percent poly(aluminium-chloride) (PAC) and 90 wt. % 0.02M HNO₃ solution. The PAC solution was added drop-wise at low rpm and, as the viscosity of the pigmented latex mixture increased, the rpm of the polytron probe also increased to 5,000 rpm for a period of 2 minutes. This produced a flocculation or hetero-coagulation of gelled particles consisting of nanometer sized latex particles, 9% wax and 10% pigment for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 136.5 grams of Latex B was then introduced into the reactor while stirring. After an additional 30 minutes to 1 hour, the particle size measured was 5.45 microns with a GSDv of 1.18 and GSDn of 1.21. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 5.43 microns with a GSD by volume of 1.18 and GSD by number of 1.23. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was smooth and "potato" shape with nm size gel protrusion or bumps on the toner surface. The final particle size after cooling but before washing was 5.65 microns with a GSD by volume of 1.18 and GSD by number of 1.21. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 5.58 microns with $GSD_v$=1.23 and $GSD_n$=1.24. The glass transition temperature of this sample was measured by DSC and found to have Tg(onset)=49.1° C. The q/d of parent toner after 60 minutes is −0.37 and −0.28 fC/microns in C and A zones. The A/C ratio the RH sensitivity indicator is 0.76.

EXAMPLE 15

Preparation of Toner Particles from Core/Shell Latex C Containing 30% Core/70% Shell with 1.23% by Weight DVB to Monomer Into a 2 liter glass reactor equipped with an overhead stirrer and heating mantle was dispersed 258.4 grams of Latex C having a 42 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a 1 percent calcium chloride dihydride solution into 573.3 grams of water with high shear-stirring by means of a polytron. To this mixture was added 34 grams of a coagulant solution consisting of 10 weight percent poly(aluminium-chloride) (PAC) and 90 wt. % 0.02M $HNO_3$ solution. The PAC solution was added drop-wise at low rpm and, as the viscosity of the pigmented latex mixture increased, the rpm of the polytron probe also increased to 5,000 rpm for a period of 2 minutes. This produced a flocculation or hetero-coagulation of gelled particles consisting of nanometer sized latex particles, 9% wax and 10% pigment for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 136.5 grams of Latex C was then introduced into the reactor while stirring. After an additional 30 minutes to 1 hour, the particle size measured was 6.89 microns with a GSDv of 1.25 and GSDn of 1.42. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 7.5 microns with a GSD by volume of 1.26 and GSD by number of 1.38. The pH was then reduced to 4.5 using a2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was "rough potato" shape with nm size gel protrusion or bumps on the toner surface. The final particle size after cooling but before washing was 7.42 microns with a GSD by volume of 1.26 and GSD by number of 1.38. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 7.14 microns with $GSD_v$=1.25 and $GSD_n$=1.39. The glass transition temperature of this sample was measured by DSC and found to have Tg(onset)=53.7° C. The q/d of parent toner after 60 minutes is −0.46 and −0.28 fC/microns in C and A zones. The A/C ratio the RH sensitivity indicator is 0.61.

EXAMPLE 16

Preparation of Toner Particles from Core/Shell Latex D Containing 40% Core/60% Shell with 1.23% by Weight DVB to Monomer Into a 2 liter glass reactor equipped with an overhead stirrer and heating mantle was dispersed 216.1 grams of Latex D having a 50.22 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a 1 percent calcium chloride dihydride solution into 615.6 grams of water with high shear stirring by means of a polytron. To this mixture was added 34 grams of a coagulant solution consisting of 10 weight percent poly(aluminium-chloride) (PAC) and 90 wt. % 0.02M $HNO_3$ solution. The PAC solution was added drop-wise at low rpm and, as the viscosity of the pigmented latex mixture increased, the rpm of the polytron probe also increased to 5,000 rpm for a period of 2 minutes. This produced a flocculation or hetero-coagulation of gelled particles consisting of nanometer sized latex particles, 9% wax and 10% pigment for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 114.2 grams of Latex D was then introduced into the reactor while stirring. After an additional 30 minutes to 1 hour, the particle size measured was 7.26 microns with a GSDv of 1.21 and GSDn of 1.41. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 7.66 microns with a GSD by volume of 1.22 and GSD by number of 1.34. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was "rough potato" shape with nm size gel protrusion or bumps on the toner surface. The final particle size after cooling but before washing was 7.74 microns with a GSD by volume of 1.24 and GSD by number of 1.34. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 7.80 microns with $GSD_v$=1.28 and $GSD_n$=1.38. The glass transition temperature of this sample was measured by DSC and found to have Tg(onset)=44.6° C. The q/d of parent toner after 60 minutes is −0.46 and −0.28 fC/microns in C and A zones. The A/C ratio the RH sensitivity indicator is 0.61.

EXAMPLE 17

Preparation of Toner Particles from Core/Shell Latex E Containing 10% Core/90% Shell with 1.23% by Weight DVB to Monomer and 79% Styrene in Shell Into a 2 liter glass reactor equipped with an overhead stirrer and heating mantle was dispersed 257.8 grams of Latex E having a 42.1 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a 1 percent calcium chloride dihydride solution into 573.9 grams of water with high shear stirring by means of a polytron. To this mixture was added 34 grams of a coagulant solution consisting of 10 weight percent poly(aluminium-chloride) (PAC) and 90 wt. % 0.02M $HNO_3$ solution. The PAC solution was added drop-wise at low rpm and, as the viscosity of the pigmented latex mixture increased, the rpm of the polytron probe also increased to 5,000 rpm for a period of 2 minutes. This produced a flocculation or heterocoagulation of gelled particles consisting of nanometer sized latex particles, 9% wax and 10% pigment for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 136.2 grams of Latex E was then introduced into the reactor while stirring. After an additional 30 minutes to 1 hour, the particle size measured was 5.40 microns with a GSDv of 1.22 and GSDn of 1.28. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 5.87 microns with a GSD by volume of 1.23 and GSD by number of 1.27. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was smooth and "potato" shape with nm size gel protrusion or bumps on the toner surface. The final particle size after cooling but before washing was 5.65 microns with a GSD by volume of 1.18 and GSD by number of 1.21. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 5.71 microns with $GSD_v$=1.23 and $GSD_n$=1.28. The glass transition temperature of this sample was measured by DSC and found to have Tg(onset)=55.1° C. The q/d of parent toner after 60 minutes is −0.37 and −0.28 fC/microns in C and A zones. The A/C ratio the RH sensitivity indicator is 0.76.

EXAMPLE 18

Preparation of Toner Particles from Core/Shell Latex F Containing 20% Core/80% Shell with 1.23% by Weight DVB to Monomer and 79% Styrene in Shell Into a 2 liter glass reactor equipped with an overhead stirrer and heating mantle was dispersed 255.3 grams of Latex F having a 42.5 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a 1 percent calcium chloride dihydride solution into 576.3 grams of water with high shear stirring by means of a polytron. To this mixture was added 34 grams of a coagulant solution consisting of 10 weight percent poly(aluminium-chloride) (PAC) and 90 wt. % 0.02M $HNO_3$ solution. The PAC solution was added drop-wise at low rpm and, as the viscosity of the pigmented latex mixture increased, the rpm of the polytron probe also increased to 5,000 rpm for a period of 2 minutes. This produced a flocculation or heterocoagulation of gelled particles consisting of nanometer sized latex particles, 9% wax and 10% pigment for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 134.9 grams of Latex F was then introduced into the reactor while stirring. After an additional 30 minutes to 1 hour, the particle size measured was 5.28 microns with a GSDv of 1.21 and GSDn of 1.28. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 5.57 microns with a GSD by volume of 1.22 and GSD by number of 1.27. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was smooth and "potato" shape with nm size gel protrusion or bumps on the toner surface. The final particle size after cooling but before washing was 5.41 microns with a GSD by volume of 1.22 and GSD by number of 1.27. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 5.28 microns with $GSD_n$=1.22 and $GSD_n$=1.27. The glass transition temperature of this sample was measured by DSC and found to have Tg(onset)=54.0° C. The q/d of parent toner after 60minutes is −0.37 and −0.28 fC/microns in C and A zones. The A/C ratio the RH sensitivity indicator is 0.76.

EXAMPLE 19

Preparation of Toner Particles from Core/Shell Latex G Containing 30% Core/70% Shell with 1.23% by Weight DVB to Monomer and 79% Styrene in Shell Into a 2 liter glass reactor equipped with an overhead stirrer and heating mantle was dispersed 223.6 grams of Latex G having a 48.53 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a 1 percent calcium chloride dihydride solution into 608.1 grams of water with high shear stirring by means of a polytron. To this mixture was added 34 grams of a coagulant solution consisting of 10 weight percent poly(aluminium-chloride) (PAC) and 90 wt. % 0.02M HNO$_3$ solution. The PAC solution was added drop-wise at low rpm and, as the viscosity of the pigmented latex mixture increased, the rpm of the polytron probe also increased to 5,000 rpm for a period of 2 minutes. This produced a flocculation or hetero-coagulation of gelled particles consisting of nanometer sized latex particles, 9% wax and 10% pigrnent for the core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 118.1 grams of Latex G was then introduced into the reactor while stirring. After an additional 30 minutes to 1 hour, the particle size measured was 5.69 microns with a GSDv of 1.22 and GSDn of 1.29. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 6.06 microns with a GSD by volume of 1.22 and GSD by number of 1.28. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was "rough potato" shape with nm size gel protrusion or bumps on the toner surface. The final particle size after cooling but before washing was 5.67 microns with a GSD by volume of 1.22 and GSD by number of 1.29. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 5.81 microns with GSD$_v$=1.22 and GSD$_n$=1.29. The glass transition temperature of this sample was measured by DSC and found to have Tg(onset)=51.3° C. The q/d of parent toner after 60 minutes is −0.28 and −0.18 fC/microns in C and A zones. The A/C ratio the RH sensitivity indicator is 0.64.

EXAMPLE 20

Preparation of Toner Particles from Core Shell Latex H Containing 40% Core/60% Shell with 1.23% by Weight DVB to Monomer and 79% Styrene in Shell Into a 2 liter glass reactor equipped with an overhead stirrer and heating mantle was dispersed 228.4 grams of Latex H having a 47.52 percent solids content, 60.29 grams of POLYWAX 850 dispersion, EA-Wax-55 having a solids content of 30.60 percent, 126.71 grams of a Regal 330 carbon black dispersion WA1945 prepared by Sun Chemical having a solids content of 16.92 percent, 11.01 grams of a 1 percent calcium chloride dihydride solution into 603.3 grams of water with high shear stirring by means of a polytron. To this mixture was added 34 grams of a coagulant solution consisting of 10 weight percent poly(aluminium-chloride) (PAC) and 90 wt. % 0.02M HNO$_3$ solution. The PAC solution was added drop-wise at low rpm and, as the viscosity of the pigmented latex mixture increased, the rpm of the polytron probe also increased to 5,000 rpm for a period of 2 minutes. This produced a flocculation or hetero-coagulation of gelled particles consisting of nanometer sized latex particles, 9% wax and 10% pigment for the-core of the particles. The pigmented latex/wax slurry was heated at a controlled rate of 0.5° C./minute up to approximately 52° C. and held at this temperature or slightly higher to grow the particles to approximately 5.0 microns. Once the average particle size of 5.0 microns was achieved, 120.65 grams of Latex H was then introduced into the reactor while stirring. After an additional 30 minutes to 1 hour, the particle size measured was 6.24 microns with a GSDv of 1.22 and GSDn of 1.33. The pH of the resulting mixture was then adjusted from 2.0 to 7.0 with aqueous base solution of 4 percent sodium hydroxide and allowed to stir for an additional 15 minutes. Subsequently, the resulting mixture was heated to 93° C. at 1.0° C. per minute and the particle size measured was 6.83 microns with a GSD by volume of 1.23 and GSD by number of 1.30. The pH was then reduced to 4.5 using a 2.5 percent Nitric acid solution for 30 minutes. After 30 minutes, the pH was reduced again to 4.0 with 2.5 percent nitric acid solution and the resultant mixture was then allowed to coalesce for 4.5 hrs at a temperature of 93° C. The morphology of the particles was "rough potato" shape with nm size gel protrusion or bumps on the toner surface. The final particle size after cooling but before washing was 7.27 microns with a GSD by volume of 1.27 and GSD by number of 1.33. The particles were washed 6 times, where the 1st wash was conducted at pH of 10 at 63° C., followed by 3 washes with deionized water at room temperature, one wash carried out at a pH of 4.0 at 40° C., and finally the last wash with deionized water at room temperature. The final average particle size of the dried particles was 6.60 microns with GSD$_v$=1.22 and GSD$_n$=1.32. The glass transition temperature of this sample was measured by DSC and found to have Tg(onset)=44.7° C. The q/d of parent toner after 60 minutes is −0.28 and −0.18 fC/microns in C and A zones. The A/C ratio the RH sensitivity indicator is 0.64.

A summary of the Toners formed in Examples 12-20 is provided in Table 2.

TABLE 2

| Example No. | Latex ID | Core/Shell Ratio, % DVB | Toner d50 | GSDv | GSDn | Fines (<4 um) | Tg(onset) deg C. |
|---|---|---|---|---|---|---|---|
| 12 | K | 30C/70S, 0.3% | 5.39 | 1.19 | 1.23 | 9.76 | 47.9 |
| 13 | A | 10C/90S, 1.23% | 6.75 | 1.28 | 1.41 | 14.56 | 49.9 |
| 14 | B | 20C/80S, 1.23% | 5.58 | 1.23 | 1.24 | 8.32 | 49.1 |
| 15 | C | 30C/70S, 1.23% | 7.14 | 1.25 | 1.39 | 10.87 | 48.4 |
| 16 | D | 40C/60S, 1.23% | 7.8 | 1.27 | 1.37 | 9.7 | 44.6 |
| 17 | E | 10C/90S, 1.23% | 5.71 | 1.23 | 1.27 | 10.57 | 55.1 |
| 18 | F | 20C/80S, 1.23% | 5.28 | 1.22 | 1.27 | 18.95 | 54.0 |
| 19 | G | 30C/70S, 1.23% | 5.81 | 1.22 | 1.29 | 15.11 | 51.3 |
| 20 | H | 40C/60S, 1.23% | 6.6 | 1.22 | 1.30 | 10.83 | 44.7 |

Figure 6A:
FIGS. 6A and B depict SEM images of the toners formed in Examples 17 and 18.
Figure 6B:
Figure 7A:
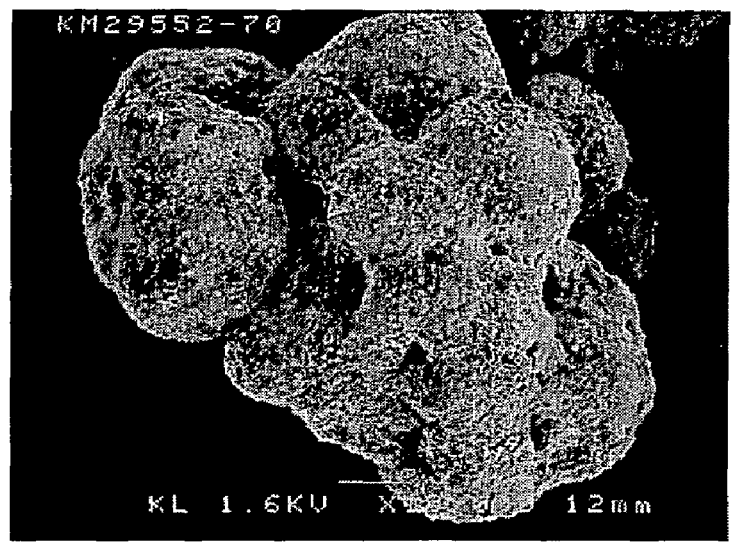
FIGS. 7A and B depict SEM images of the toners formed in Examples 19 and 20.
Figure 7B:
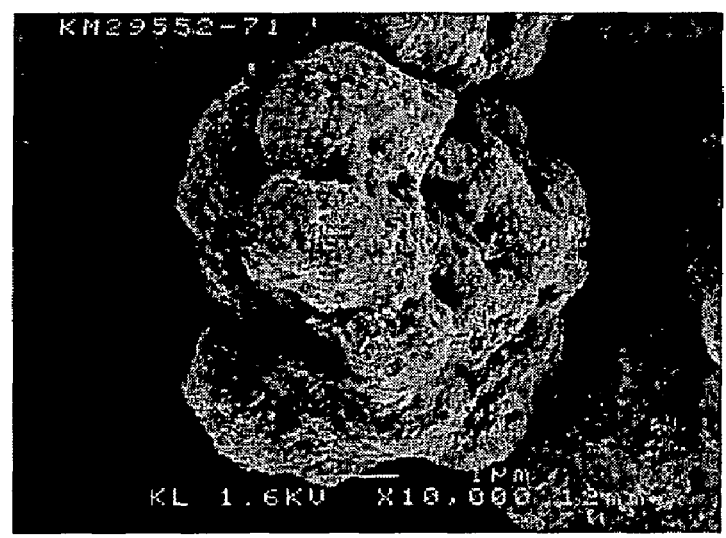

When the core/shell latexes described herein are used to prepared toner, there is a dramatic effect on the surface morphology of the toner particles. In particular, the toner formed in Examples 17 and 18, containing latexes consisting of 10 or 20% cross-linked core and 90 or 80% linear shell, respectively, have bumps or minor nanometer size cross-linked gel protrusions on the particle surface, as illustrated in the SEM images of FIGS. 6A and 6A and B, respectively. In contrast, in the toner formed in Examples 19 and 20, in which the fraction of cross-linked core is 30 or 40%, respectively, of the entire latex, these hard cross-linked gel nm size protrusions become more apparent by size and number on the toner particle surface, as illustrated in FIGS. 7A and B, respectively. As the shell portion of the latex decreases, there is less linear latex available to coalescence the particles, which may contribute to the more irregular and rough particle morphology for the images in FIGS. 7A and B.

The nanometer size gel bumps on the surface of the toner can be beneficial for the toner performance. Since gel particles are firmly attached to the toner surface, this can improve the aging performance of the developer. There is less chance of the surface additives becoming buried inside the toner and resulting in loss of development.

Figure 8:
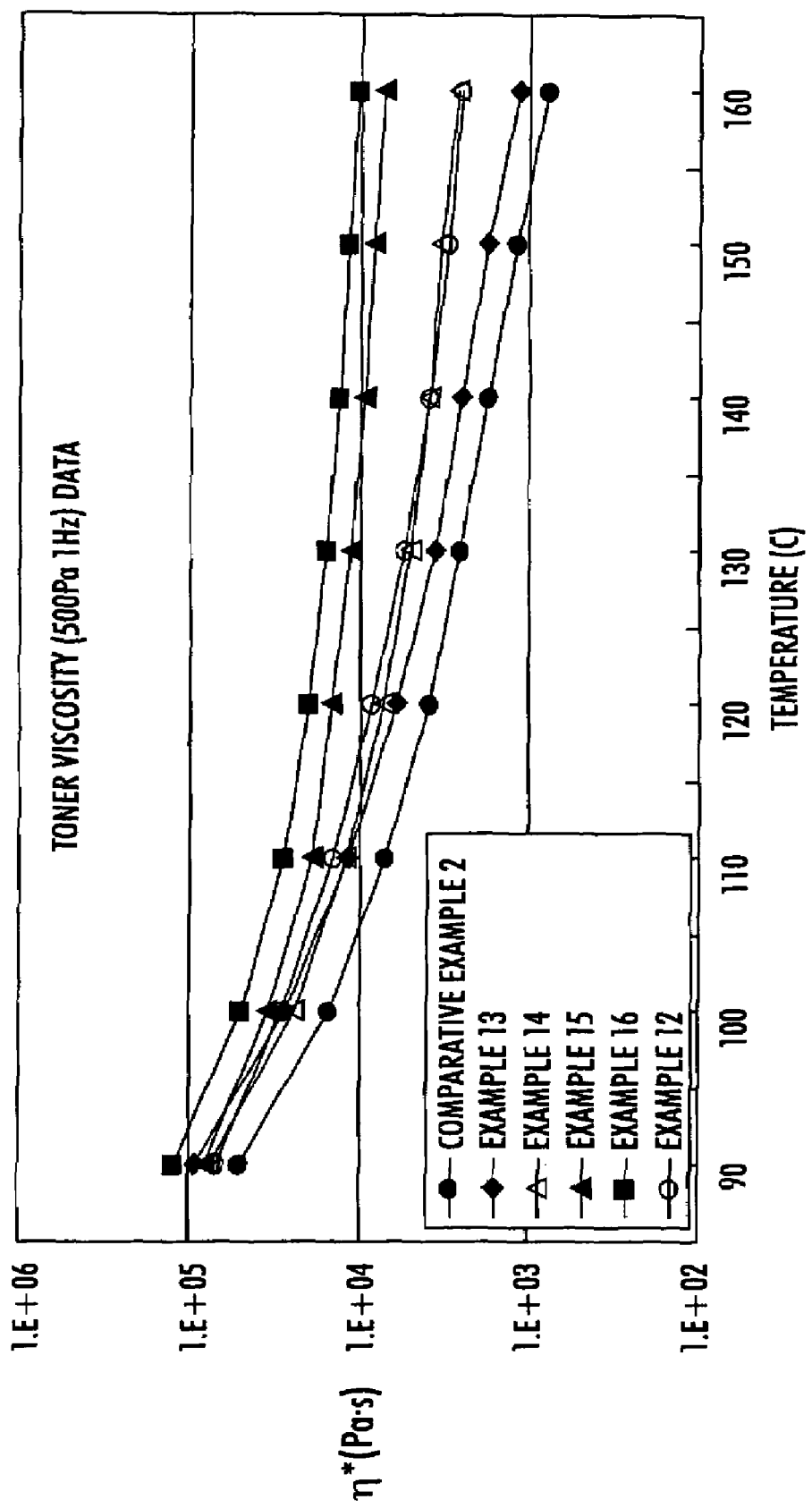
FIG. 8 depicts the viscosity of the toners of Examples 12-16, as compared to the toner mixture formed in Comparative Example 2.
Figure 9:
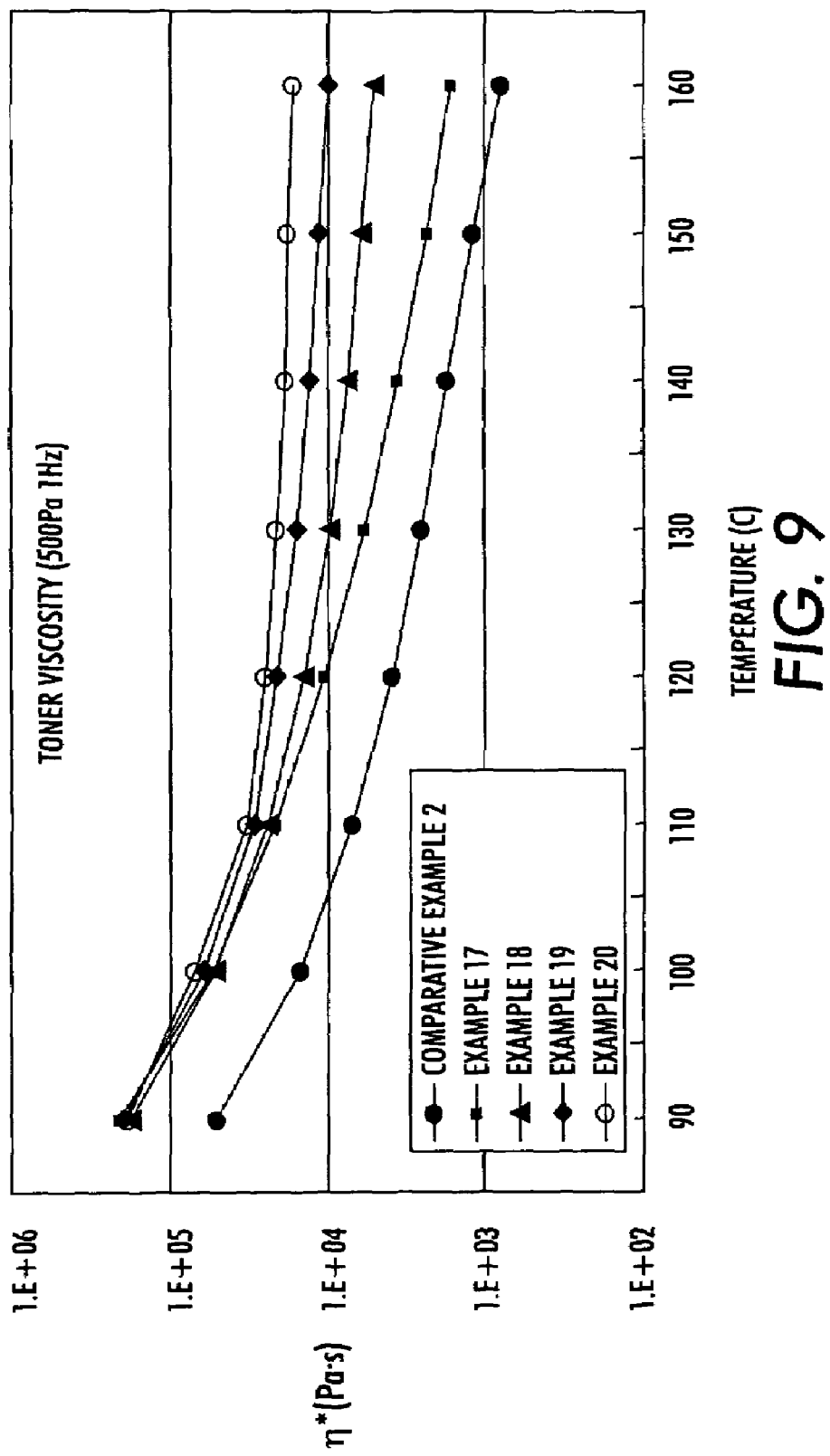
FIG. 9 depicts the viscosity of the toners of Examples 17-20, as compared to the toner mixture formed in Comparative Example 2.

Toners prepared from cross-linked core/linear shell latexes consisting of 1.23percent cross-linking reagent divinyl benzene (DVB) in the latex core (Examples 13-20) show significantly more control and greater formulation flexibility covering a larger latitude in toner rheological properties when compared to a toner (Comparative Example 2) containing the same amount of cross-linking, but prepared using the two latex approach. As illustrated in the toner viscosity graphs of FIG. 8 and 9, the toners prepared from the latexes with 10% cross-linked core and 90% linear latex shell come close to matching the control toner viscosity with the same amount of DVB. A sixth toner viscosity curve was added to FIG. 8 for the toner of Example 12 prepared from a core (30%) /shell (70%) latex where only 0.3% DVB was used instead of 1.23% to give the cross-linked core of the latex. This toner viscosity curve comes very close to matching the viscosity curve for the toner of Example 14 using 1.23% DVB but in a 20% core of the latex. By changing the ratio of latex core to shell at the same or different amounts of cross-linker the cross-linking density in the latex and the subsequent toner can be controlled. This is evident in the spread of the toner viscosity curves of FIGS. 8 and 9.

Figure 10:
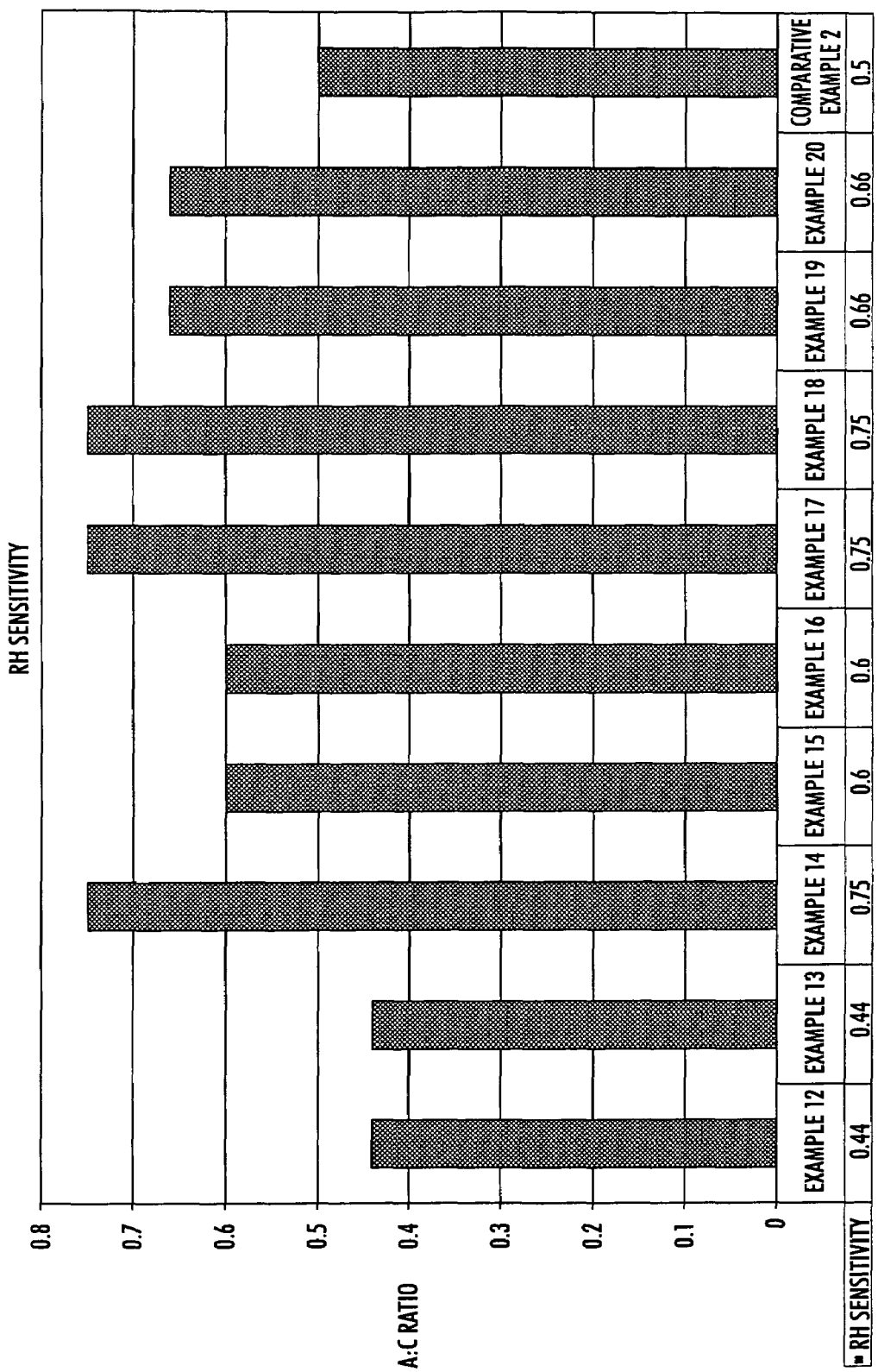
FIG. 10 depicts the relative humidity (RH) sensitivity of the toners of Examples 12-20 and Comparative Example 2.

FIG. 10 depicts the relative humidity (RH) sensitivity of the toners of Examples 12-20 and Comparative Example 2. The values depicted were calculated by dividing the q/d from the A-zone by the q/d from the C-zone. The higher the number the less RH sensitive is the toner.

What is claimed is:

1. A latex comprising polymer particles comprising a cross-linked polymer core and a linear non-cross-linked polymer shell wherein the polymer of the core and of the shell comprises a polymer of the reaction of monomers comprising a styrene monomer, 2-carboxyethyl acrylate monomer and at least one acrylate monomer selected from the group consisting of n-butyl acrylate, butyl methacrylate, propyl acrylate, propyl methacrylate, ethyl acrylate, ethyl methacrylate, methyl acrylate and methyl methacrylate, and in the core, also comprising at least one cross-linker.

2. The latex according to claim 1, wherein said polymer particles comprise from about 5% to about 50% by weight of the cross-linked polymer core and from about 95% to about 50% by weight of the linear non-cross-linked polymer shell.

3. The latex according to claim 2, wherein said polymer particles comprise from about 10% to about 40% by weight of the cross-linked polymer core and from about 90% to about 60% by weight of the linear non-cross-linked polymer shell.

4. The latex according to claim 1, wherein said polymer particles comprise from about 0.1% to about 40% by weight of said at least one cross-linker.

5. The latex according to claim 4, wherein said at least one cross-linker is selected from the group consisting of divinyl benzene, divinyl toluene, diacrylates and dimethacrylates.

6. The latex according to claim 5, wherein said cross-linker is divinyl benzene.

7. The latex according to claim 1, wherein the at least one acrylate monomer comprises n-butyl acrylate.

8. The latex according to claim 1, wherein the styrene monomer and the acrylate monomers form at least 90% by weight of the polymer.

9. A method for forming polymer particles having a core and a shell, wherein the polymer of the core and of the shell comprises a polymer of the reaction of monomers comprising a styrene monomer, 2-carboxyethyl acrylate monomer and at least one acrylate monomer selected from the group consisting of n-butyl acrylate, butyl methacrylate, propyl acrylate, propyl methacrylate, ethyl acrylate, ethyl methacrylate, methyl acrylate and methyl methacrylate, and in the core, also comprising at least one cross linker, said method comprising:

polymerizing a first monomer emulsion containing at least one cross-linker to form cross-linked core particles; and polymerizing a second monomer emulsion in the presence of said cross-linked core particles to form a linear non-cross-linked shell on said cross-linked core particles, thus forming polymer particles having a core and a shell.

10. The method according to claim 9, wherein the cross-linked core polymer particles form about 5% to about 50% by weight of said polymer particles and the linear non-cross-linked shell forms from about 95% to about 50% by weight of the polymer particles.

11. The method according to claim 9, wherein said first monomer emulsion comprises said at least one cross-linker in an amount of from about 0.1% to about 40% by weight of monomer in said first and second monomer emulsions.

12. A method for forming toner, comprising:
forming polymer particles having a core and a shell by the method according to claim 9; and
aggregating said polymer particles with colorant and coalescing the aggregates to form toner.

13. Toner comprising coalesced aggregates of colorant and polymer particles, said polymer particles comprising a cross-linked polymer core and a linear non-cross-linked polymer shell according to claim 1.

14. Toner according to claim 13, wherein said polymer particles comprise from about 5% to about 50% by weight of the cross-linked polymer core and from about 95% to about 50% by weight of the linear non-cross-linked polymer shell.

* * * * *